(12) United States Patent
Unger

(10) Patent No.: US 6,477,197 B1
(45) Date of Patent: Nov. 5, 2002

(54) METHOD AND APPARATUS FOR A CABLE MODEM UPSTREAM RF SWITCHING SYSTEM

(75) Inventor: David Unger, Windham, NH (US)

(73) Assignee: ARRIS International, Inc., Duluth, GA (US)

(*) Notice: Subject to any disclaimer, the term of this patent is extended or adjusted under 35 U.S.C. 154(b) by 0 days.

(21) Appl. No.: 09/109,258

(22) Filed: Jun. 30, 1998

(51) Int. Cl.$^7$ .............................. H04B 1/38; H04L 5/16
(52) U.S. Cl. ................... 375/222; 375/328; 375/340; 375/347; 375/349
(58) Field of Search .................. 375/147, 316, 375/324, 328, 338, 340, 346, 347, 349, 220, 222, 260, 267; 333/1, 100, 101, 105, 106; 370/357, 360, 351–430; 455/179.1, 180.1, 132, 133, 134, 135–140, 31.1, 32.1, 161.1, 161.2; 329/327, 315

(56) References Cited

U.S. PATENT DOCUMENTS

| | | | | |
|---|---|---|---|---|
| 4,236,251 A | * | 11/1980 | Ohgishi et al. | 455/180.1 |
| 5,249,303 A | * | 9/1993 | Goeken | 455/431 |
| 5,303,400 A | * | 4/1994 | Mogi | 455/186.1 |
| 5,425,051 A | * | 6/1995 | Mahany | 375/132 |
| 5,457,815 A | * | 10/1995 | Morewitz, II | 455/161.1 |
| 5,479,441 A | * | 12/1995 | Tymes et al. | 375/130 |
| 5,592,383 A | * | 1/1997 | Rogers et al. | 455/456 |
| 5,602,903 A | * | 2/1997 | LeBlanc et al. | 455/456 |
| 5,621,770 A | * | 4/1997 | Zastera | 375/347 |
| 5,682,147 A | * | 10/1997 | Eaton et al. | 340/825.03 |
| 5,740,533 A | * | 4/1998 | Lin | 455/432 |
| 5,781,582 A | * | 7/1998 | Sage et al. | 375/134 |
| 5,812,937 A | * | 9/1998 | Takahisa et al. | 455/66 |
| 5,887,247 A | * | 3/1999 | Baltus et al. | 455/277.2 |
| 5,937,338 A | * | 8/1999 | Tomita | 455/161.2 |
| 5,960,336 A | * | 9/1999 | Ikawa et al. | 455/277.2 |
| 5,960,341 A | * | 9/1999 | LeBlanc et al. | 455/426 |
| 6,044,090 A | * | 3/2000 | Grau et al. | 370/485 |
| 6,047,019 A | * | 4/2000 | Ishii | 375/147 |
| 6,124,806 A | * | 9/2000 | Cunningham et al. | 340/870.02 |
| 6,263,077 B1 | * | 7/2001 | Zuranski et al. | 379/410 |

* cited by examiner

Primary Examiner—Stephen Chin
Assistant Examiner—Lenny Jiang

(57) ABSTRACT

A method and apparatus providing for a multifrequency receiver with upstream switching of received frequencies. The invention is described in connection with a cable plant having a plurality of modems transmitting at a first frequency. It may be desirable to locate a second frequency having more desirable transmission characteristics and to cause the modems to transmit at the second frequency. It is disclosed to utilize an additional receiver coupled through a switch which may be used to both locate a desirable frequency and to facilitate automatic switching of the cable modems from the first frequency to the second frequency.

7 Claims, 4 Drawing Sheets

METHOD AND APPARATUS FOR A CABLE MODEM UPSTREAM RF SWITCHING SYSTEM

BACKGROUND OF THE INVENTION

1. Field of the Invention

The present invention relates to the field of networking and more specifically to provide information over a cable modem network.

2. Description of the Related Art

In a cable modem network, information is carried over a cable from a cable modem termination station (CMTS) to a plurality of cable modems (CMs). One issue which exists with transmission of this information is that various sources of noise (such as radio signals from ham radio operations and the like) may ingress into the cable modem channel. It is desirable to find a frequency for transmission of the information which is ingress-free.

One prior art solution is to utilize a spectrum analyzer to analyze the channels in order to determine a desirable frequency to use for transmission. Unfortunately use of a spectrum analyzer is a relatively manual and time-consuming process.

Thus, what is needed is a method and apparatus allowing of analyzing channels for ingress in a cable modem plant or the like. It is further desirable that the method and apparatus be as automatic as possible requiring little if any operator intervention.

SUMMARY OF THE INVENTION

A multifrequency receiver comprising at least a first receiver circuit and a second receiver circuit where the second receiver circuit programmable to scan available frequencies of a received signal. In one embodiment, the second receiver circuit may determine that a new frequency should be used for transmission. In such an event, the transmitting devices may be instructed to start transmission at the new frequency. The second receive circuit is available to facilitate the change over. The invention is described in connection with a cable plant but may have application in any of a number of systems which allow for multifrequency transmission.

Figure 1:
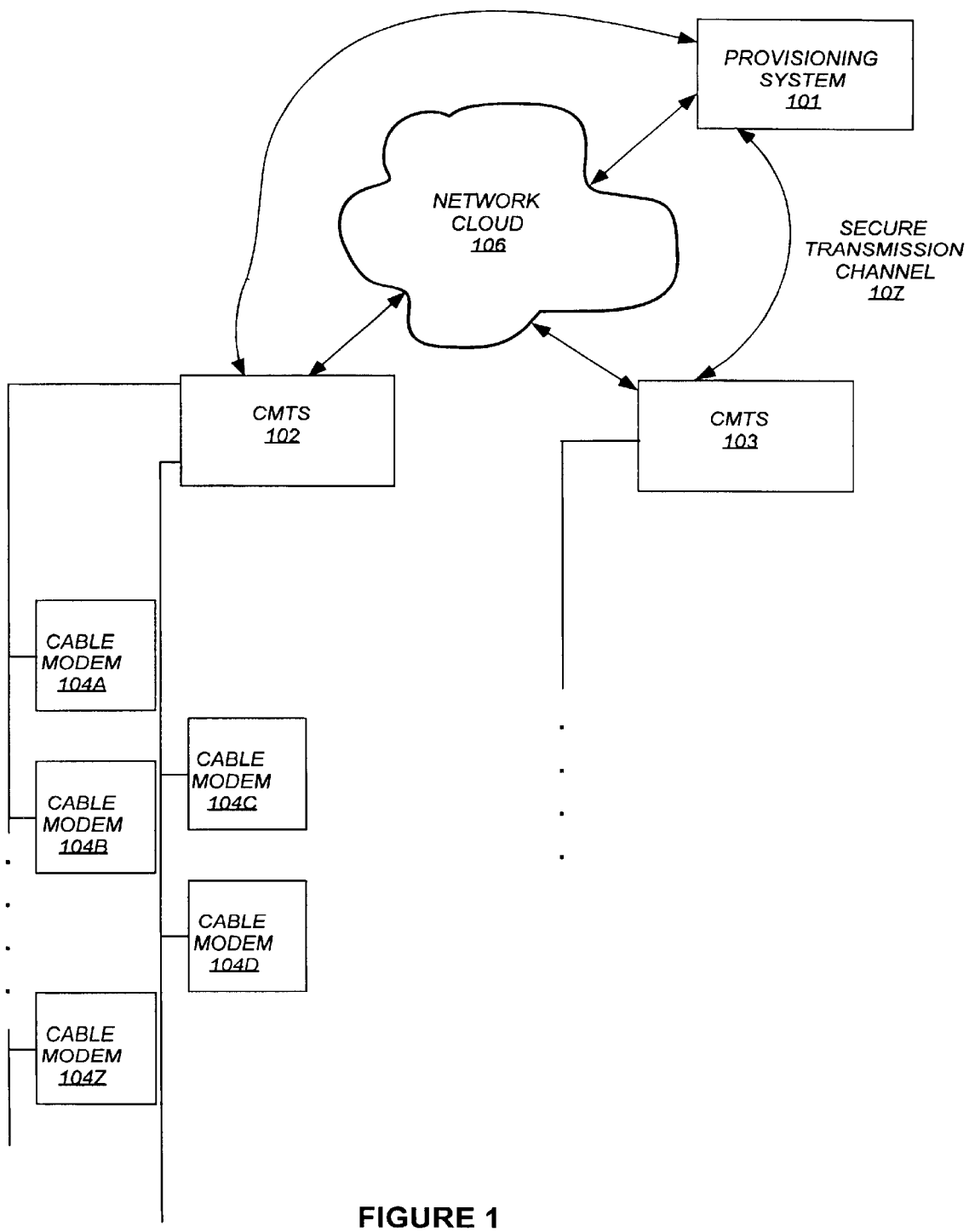
FIG. 1 illustrates a cable modem network as may implement the present invention.
Figure 3:
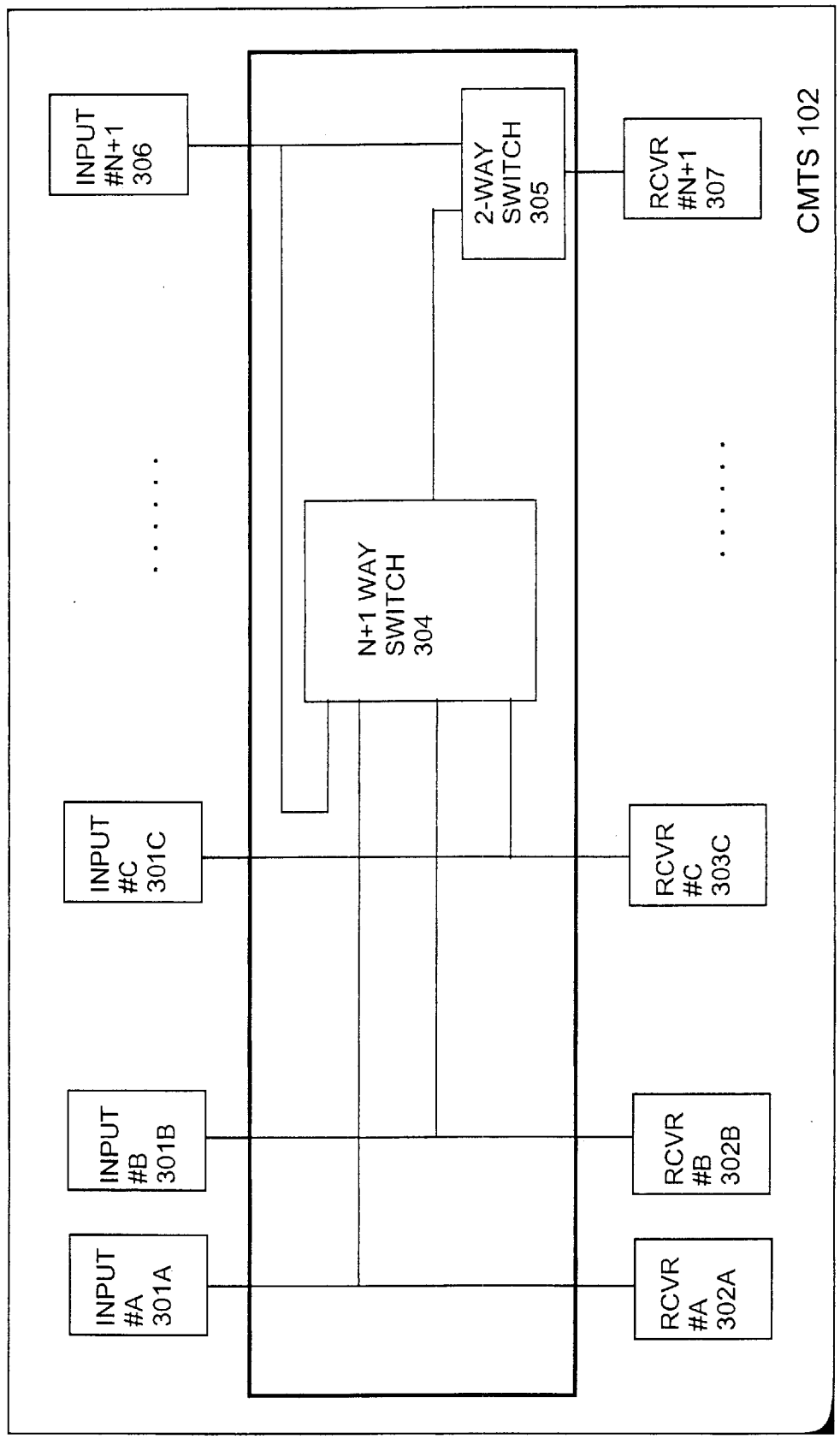
FIG. 3 illustrates a spectrum analyzer as may be implemented by the present invention.

For ease of reference, it might be pointed out that reference numerals in all of the accompanying drawings typically are in the form "drawing number" followed by two digits, xx; for example, reference numerals on FIG. 1 may be numbered 1xx; on FIG. 3, reference numerals may be numbered 3xx. In certain cases, a reference numeral may be introduced on one drawing and the same reference numeral may be utilized on other drawings to refer to the same item.

DETAILED DESCRIPTION OF THE EMBODIMENTS THE PRESENT INVENTION

FIG. 1 illustrates an overall diagram of a cable modem network as may utilize the present invention.

In the described embodiment, the network comprises a provisioning system 101, a cable modem termination system (CMTS) 102 coupled in communication with the provisioning system over a network 106 and a plurality of cable modems (CM) 104A to 104Z. The CMTS is sometimes referred to in the art as a cable modem head end.

In addition to communication over the network cloud 106, the provisioning system 101 is coupled to communicate with the CMTS 102 over a secure communication channel 108. The secure communication channel may be any of a number of communication channels. For example, rather than providing a separate communication channel, information may be encrypted by the provisioning server 101 and decrypted by the CMTS 102. Alternatively, a separate physical channel may be provided or a manual means of communication information using a trusted courier may be utilized.

The network cloud 106 may be any of a number of conventional networks. In the described embodiment, an IP network is utilized. This network does not need to be a secure network.

A plurality of CMTS devices (such as CMTS 103) may be coupled in communication with a provisioning system 101. As illustrated, CMTS 103 is coupled in communication with the provisioning system 101 over network cloud 106 and over secure transmission channel 107.

As discussed above, an issue exists because there may be ingress into a cable modem 109 (see FIG. 2) from various sources such as outside radio signals and the like. It would be beneficial to find a channel which is ingress-free or as ingress-free as possible. It would further be beneficial to find such a channel using a method and apparatus which is as automated as possible requiring little if any user intervention.

Figure 2:
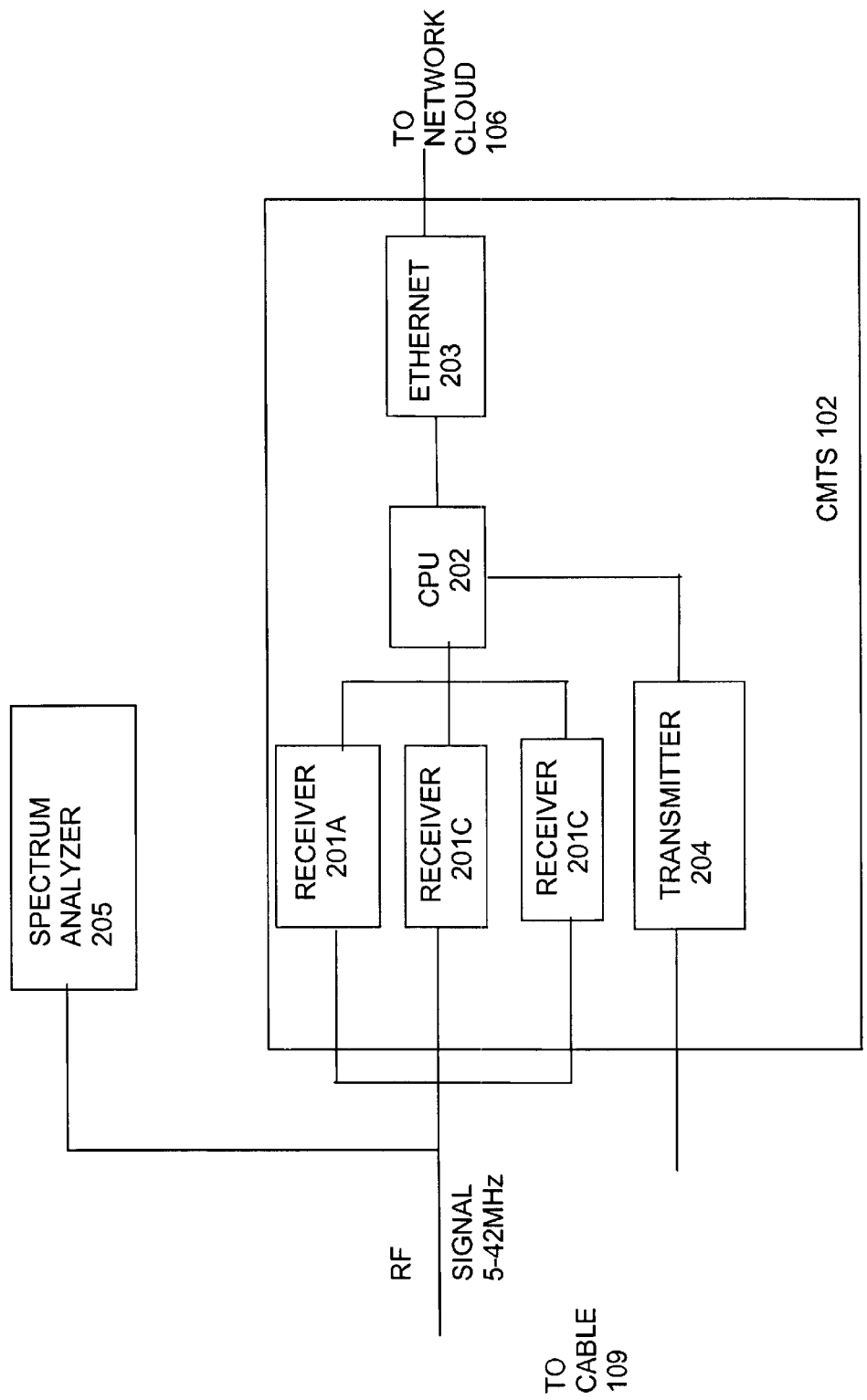
FIG. 2 illustrates a prior art spectrum analyzer.

FIG. 2 illustrates a prior art system for selecting a channel. In the prior art system, the CMTS 102 receives an RF signal on a frequency from 5–42 MHz on cable modem 109. The received signal is fed to receivers 201 A–C which are controlled by CPU 202. Each of the receivers may receive signals from one or more of cable modems 104A–Z. Signals are transmitted to the cable modem 109 over transmitter 204. The CPU 202 also provides an interface to the network cloud 106 through ethernet interface 203. A spectrum analyzer 205 is used to analyze the various frequencies available for transmission on the cable modem 109 in order to select a desirable frequency channel. Once the desired frequency channel is selected, all cable modems 104A–Z and the CMTS 102 must be configured to begin transmitting and receiving on the selected frequency. This process typically requires temporarily shutting down service to all cable modems 104A–Z, reprogramming each of the modems to the new frequency, and then restarting the system using the new frequency.

FIG. 3 illustrates applicable components of a cable modem termination station as may implement the present invention. As is illustrated by FIG. 3, the embodiment provides a N+1 input 306 and receiver 307. Thus, in an embodiment of a cable modem termination station supporting, e.g., 24 inputs, a total of 25 inputs and receivers are utilized. As will be described, this advantageously allow the "extra" receiver 307 to act as a diagnostics receiver, to act as a backup receiver in the event of a failure of one of the other receivers, to act as a spectrum analyzer, or to allow for temporary operation of two receivers on two different frequencies on the same input port which allows for migration of cable modems from one modem to another without need to shut down the cable plant as has been characteristic of prior art systems.

Each of the receivers 302A–C is coupled to an input 301A–C. Although the CMTS 102 is illustrated with 3 inputs 301A–C, in alternative embodiments there may be greater or fewer inputs without departure from the present invention. In addition to being coupled to the receivers 302A–C, each of the inputs is also coupled as input to switch 304. In addition, input 306 is coupled as an input to switch 304. Thus, any of inputs 301A–C or 306 may be selected as the output of switch 304.

The output of switch 304 is coupled with 2-way switch 305. Input 306 is also coupled as a second input to 2-way switch 305. The output of 2-way switch 305 is coupled to receiver 307.

Thus, it will be appreciated that receiver 307 may receive and demodulate the same data signal which is received by any of receivers 302A–C. In this mode, receiver 307 may act as a diagnostic receiver or, in the event of a failure of any of receivers 302A–C, as a backup receiver. When acting in a diagnostic or backup mode switch 304 is set to switch through the input signal from the input 301A–C for which diagnosis or backup is desired and switch 305 is set to switch through the input from switch 304.

In addition, receiver 307 may act as a spectrum analyzer by scanning any part of the input signal spectrum. In the described embodiment, the input signal spectrum is generally in the range of 5–42 MHz. By analyzing the input signal spectrum, a frequency with low ingress (low noise and RF interface) may be found and selected for use. When acting as a spectrum analyzer, switch 305 is set to switch through the input signal received on input 306.

Figure 4:
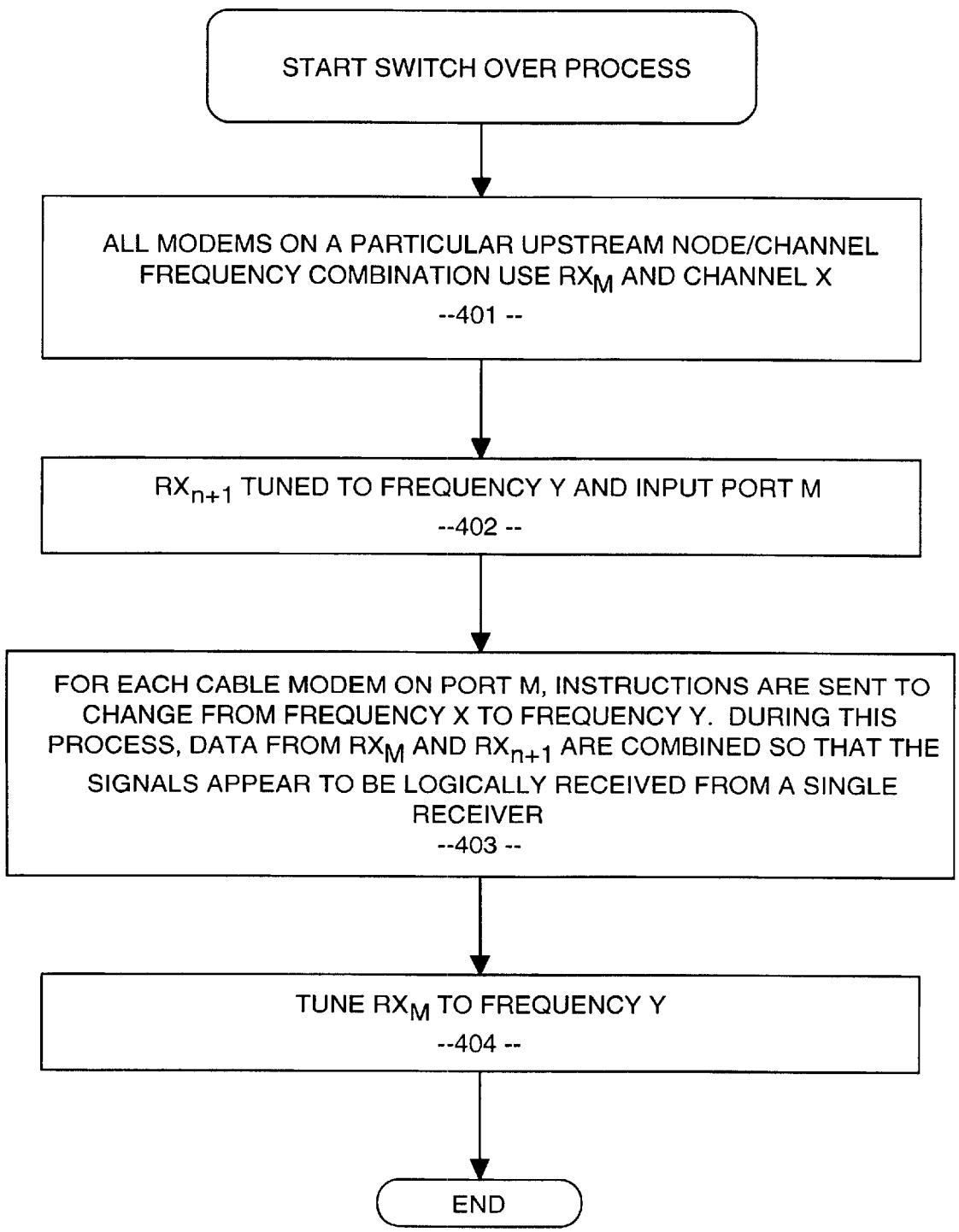
FIG. 4 is a flow diagram illustrating a switch over process as may be used by the present invention.

The receiver 307 may also be utilized to facilitate switchover of the cable modems 104A–Z from the old frequency to the new frequency, as will be further described in connection with FIG. 4. As shown by FIG. 4, all modems for a particular upstream node/channel frequency combination initially use receiver M which is receiving at frequency X. block 401. For purposes of this discussion, receiver M may be any of receivers 302A–C and input M may be any of inputs 301A–C dependent on which input is to be switched from one frequency to another.

When it is determined that it is desirable to change to a new frequency (e.g., based on high ingress on frequency X), a new frequency is selected. This new frequency may be selected for example based on receiver 307 acting as a spectrum analyzer as discussed above and finding a frequency Y with lower ingress. In any event, receiver 307 is tuned to frequency Y, block 402. In this mode, switch 304 is set to switch through the input signal from the input M and switch 305 is set to switch through the input from switch 304.

For each of the cable modems connected on input M, instructions are sent by the CMTS 102 to the cable modem to switch from frequency X to frequency Y, block 403. During this change over process, data from receiver 307 and the receiver M is combined so that the signals appear to be received from a single receiver. In this way, advantageously, the switch over process can be relatively transparent and does not require shutting down the cable plant in order to allow for the transition.

After all cable modems have been switched from frequency X to frequency Y, the receiver M may be reprogrammed to receive on frequency Y, block 404.

In the described embodiment, although not illustrated, the inputs of switch 304 are coupled through 10 dB taps to switch 304. The 10 dB tap passes the input signal unaltered to the output port (e.g., onto receivers 302A–C and passes the signal with 10 dB attenuation to the switch 304. It might also be noted that, although not shown in FIG. 3, each of the receivers 302A–C and 307 are coupled to additional circuitry in the CMTS 102 in a conventional manner.

While the present invention has been described in connection with implementation in a cable system, it may have application in any of a number of multifrequency transmission systems.

Thus, what has been disclosed is a method and apparatus providing for a frequency switching system.

What is claimed is:

1. A method of switching a plurality of cable modems from transmission on a first frequency to transmission on a second frequency comprising the steps of:

a) receiving transmissions from a first cable modem and a second cable modem on the first frequency through a first receiver tuned to the first frequency;

b) tuning a second receiver to the second frequency;

c) instructing the first cable modem to transmit on the second frequency; and d) instructing the second cable modem to transmit on the second frequency.

2. The method as recited by claim 1 further comprising the step of programming the first receiver to receive on the second frequency.

3. A cable modem termination system for switching a plurality of cable modems from transmission on a first frequency to transmission on a second frequency, comprising:

a) means for receiving transmissions from a first cable modem and a second cable modem on the first frequency through a first receiver tuned to the first frequency;

b) means for tuning a second receiver to the second frequency;

c) means for instructing the first cable modem to transmit on the second frequency; and d) means for instructing the second cable modem to transmit on the second frequency.

4. The system as recited by claim 3 further comprising means for programming the first receiver to receive on the second frequency.

5. The system as recited by claim 3, wherein the means for receiving transmissions being a receiver to act as a spectrum analyzer by scanning any part of an input signal spectrum of a transmission.

6. The system as recited by claim 5, wherein the means for receiving transmissions further includes a switch to set the receiver to act as the spectrum analyzer.

7. The system as recited by claim 6, wherein the receiver of the means for receiving transmissions can alternatively be configured to act as a backup receiver for one of the first receiver and the second receiver.

* * * * *